(12) United States Patent
Miyahara

(10) Patent No.: US 7,633,656 B2
(45) Date of Patent: Dec. 15, 2009

(54) IMAGE READING UNIT AND IMAGE READING APPARATUS HAVING THE SAME

(75) Inventor: Atsushi Miyahara, Higashikurume (JP)

(73) Assignee: Canon Kabushiki Kaisha (JP)

( * ) Notice: Subject to any disclaimer, the term of this patent is extended or adjusted under 35 U.S.C. 154(b) by 1014 days.

(21) Appl. No.: 11/094,667

(22) Filed: Mar. 30, 2005

(65) Prior Publication Data
US 2005/0219658 A1 Oct. 6, 2005

(30) Foreign Application Priority Data
Mar. 31, 2004 (JP) .............................. 2004-105870

(51) Int. Cl.
*H04N 1/04* (2006.01)
(52) U.S. Cl. .................. 358/474; 358/487; 358/475; 358/509; 355/98; 355/40; 399/361; 399/367; 359/228; 359/230
(58) Field of Classification Search ................ 358/474, 358/1.15, 518, 514, 448, 475, 509, 461, 513, 358/487; 381/169, 167, 254; 250/208.1; 399/380, 388, 36, 367; 382/169, 167, 254, 382/275; 355/18, 40, 72, 75; 359/228, 230, 359/422
See application file for complete search history.

(56) References Cited

U.S. PATENT DOCUMENTS

| 5,790,211 | A * | 8/1998 | Seachman et al. ............... 349/3 |
| 6,219,158 | B1 * | 4/2001 | Dawe ......................... 358/509 |
| 7,034,967 | B2 * | 4/2006 | Ochi et al. ................... 358/487 |
| 7,042,598 | B2 * | 5/2006 | Payne ......................... 358/474 |
| 7,142,335 | B2 * | 11/2006 | Tesavis ....................... 358/474 |
| 7,166,827 | B2 * | 1/2007 | Sugihara et al. ............ 250/208.1 |
| 7,206,102 | B2 * | 4/2007 | Fukumoto et al. ............ 358/461 |
| 7,215,448 | B2 * | 5/2007 | Onishi ........................ 358/483 |
| 7,289,156 | B2 * | 10/2007 | Silverbrook et al. ........ 348/374 |
| 7,418,234 | B2 * | 8/2008 | Murakami et al. ........... 399/401 |
| 2002/0121590 | A1 | 9/2002 | Yoshida et al. |
| 2003/0043351 | A1 * | 3/2003 | Ochi et al. ..................... 355/18 |
| 2004/0080797 | A1 * | 4/2004 | Lee ............................ 358/509 |
| 2005/0179965 | A1 * | 8/2005 | Onishi ........................ 358/483 |
| 2006/0028700 | A1 * | 2/2006 | Chi-Sheng et al. .......... 358/509 |

FOREIGN PATENT DOCUMENTS

| EP | 570958 A1 | 11/1993 |
| JP | 3-295354 A | 12/1991 |

(Continued)

*Primary Examiner*—Houshang Safaipour
*Assistant Examiner*—Negussie Worku
(74) *Attorney, Agent, or Firm*—Rossi, Kimms & McDowell LLP

(57) ABSTRACT

An image reading unit which is capable of optimally reading images from both reflective originals and transparent originals. A first rod lens array 15 collects reflected light from a reflective original that reflects light. A first photoelectric conversion element array 14 reads an image of the reflective original based on the reflected light collected by the first rod lens array 15. A second rod lens array 202 collects light transmitted through a transparent original that transmits light. A second photoelectric conversion element array 201 reads an image of the transparent original based on the transmitted light collected by the second rod lens array 202. The first photoelectric conversion element array 14 is mounted on a first substrate 16. The second photoelectric conversion element array 201 is mounted on a second substrate 203. The first substrate 16 and the second substrate 203 are disposed separately, and the first photoelectric conversion element array 14 and the second photoelectric conversion element array 201 are disposed on different planes.

4 Claims, 9 Drawing Sheets

FOREIGN PATENT DOCUMENTS

| | | |
|---|---|---|
| JP | 11-008737 A | 1/1999 |
| JP | 11-261763 A | 9/1999 |
| JP | 2003-37713 A | 2/2003 |
| JP | 2003-215733 A | 7/2003 |

* cited by examiner

TC = 15.1 mm
OPERATING WAVELENGTH $\lambda$ = 570 mm

TYPE A

TC = 17 mm
OPERATING WAVELENGTH $\lambda$ = 570 mm

TYPE B

IMAGE READING UNIT AND IMAGE READING APPARATUS HAVING THE SAME

BACKGROUND OF THE INVENTION

1. Field of the Invention

The present invention relates to an image reading unit having photoelectric conversion elements and an image reading apparatus having the image reading unit.

2. Description of the Related Art

Conventionally, as an original illuminating method used to read a transparent original such as a photographic film by a flatbed type image reading apparatus having an original platen glass, a method has been mainly used in which a transparent original guide unit that holds a light-transmitting transparent original is placed on an upper surface of the original platen glass and the original is illuminated at an upper side thereof using a surface light source unit (refer to Japanese Laid-Open Patent Publication (Kokai) No. 2003-215733 and Japanese Laid-Open Patent Publication (Kokai) No. 2003-037713, for example). An image reading apparatus using this original illuminating method is generally designed such that the best focal position is at 0 mm on the upper surface of the original platen glass, that is, a position wherein the original directly contacts the original platen glass. This is because it is assumed that main objects to be read by the conventional image reading apparatus are reflective originals that reflect light.

When reading a transparent original by the image reading apparatus, the transparent original is placed up at a level of 0.5 mm above the original platen glass by the transparent original guide unit. The mounting of a transparent original at such a level above the original platen glass is employed, for example, prevention of a Newton rings (interference pattern), and prevention of the image reading unit from reading any contamination of the transparent original when the transparent original is placed in contact with the original platen glass.

The above method of illuminating a transparent original at an upper side thereof by the surface light source unit presents no problems in practical-use even if the distance between the original platen glass and the transparent original is on the order of 0.5 mm, when this method is used in combination with a lens of a magnification optical system adopting a CCD used as a lens mounted in the image reading unit, since the magnification optical system lens has a large depth of field.

In recent years, with a view to miniaturization of an image reading unit, a unity magnification image reading unit using a rod lens array has been proposed.

However, the rod lens array of this unity magnification image reading unit has a shallow depth of field, and therefore, as is distinct from the above magnification optical system lens using a CCD, when the distance between the original platen glass and the transparent original is on the order of 0.5 mm, there arises a problem that a blurred read image which is out of focus is obtained.

Moreover, the conventional image reading apparatus is mainly intended to read reflective originals as objects to be read, and are, therefore, not able to accurately read both reflective originals and transparent originals.

SUMMARY OF THE INVENTION

It is an object of the present invention to provide a image reading unit which is capable of optimally reading images from both reflective originals and transparent originals, and an image reading apparatus having the image reading unit.

To attain the above object, in a first aspect of the present invention, there is provided an image reading unit comprising a first optical component that collects reflected light from a reflective original that reflects light, a first photoelectric conversion element device that reads an image of the reflective original based on the reflected light collected by the first optical component, a second optical component that collects light transmitted through a transparent original that transmits light, a second photoelectric conversion element device that reads an image of the transparent original based on the transmitted light collected by the second optical component, a first substrate on which the first photoelectric conversion element device is mounted, and a second substrate on which the second photoelectric conversion element device is mounted, and the first substrate and the second substrate are disposed separately, and the first photoelectric conversion element device and the second photoelectric conversion element device are disposed on different planes.

Preferably, the first optical component is adjustable so as to obtain a focal position that is suitable for a position in which the reflective original is placed, and the second optical component is adjustable so as to obtain a focal position that is suitable for a position in which the transparent original is placed.

Also preferably, the image reading unit comprises connection means electrically connecting the first substrate and the second substrate to each other and electrically connecting one of the first substrate and the second substrate and a device provided externally of the image reading unit to each other.

Also preferably, the first photoelectric conversion element device and the second photoelectric conversion element device are disposed with a height difference therebetween, the height difference being settable to an arbitrary difference.

To attain the above object, in a second aspect of the present invention, there is provided an image reading apparatus comprising an image reading unit, an original platen glass on which a reflective original or a transparent original is placed, a first illuminating component that is provided in the image reading unit, for illuminating the reflective original, and a second illuminating component that is disposed on a side of the image reading apparatus which is opposite to the image reading unit with respect to the original platen glass, for illuminating the transparent original, and the image reading unit comprises a first optical component that collects reflected light from a reflective original that reflects light, a first photoelectric conversion element device that reads an image of the reflective original based on the reflected light collected by the first optical component, a second optical component that collects light transmitted through a transparent original that transmits light, a second photoelectric conversion element device that reads an image of the transparent original based on the transmitted light collected by the second optical component, a first substrate on which the first photoelectric conversion element device is mounted, and a second substrate on which the second photoelectric conversion element device is mounted, and the first substrate and the second substrate are disposed separately, and the first photoelectric conversion element device and the second photoelectric conversion element device are disposed on different planes.

Preferably, the image reading apparatus further comprises a processing section that processes image data read from the reflective original or the transparent original by the image reading unit, a storage medium that stores the image data processed by the processing section, and a communication section that carries out data communications with an external device.

To attain the above object, in a third aspect of the present invention, there is provided an image reading unit comprising a first optical component that collects light from a first original, a first photoelectric conversion element device that reads an image of the first original based on the light collected by the first optical component, a second optical component that collects light from a second original that transmits light, a second photoelectric conversion element device that reads an image of the second original based on the light collected by the second optical component, a first substrate on which the first photoelectric conversion element device is mounted, and a second substrate on which the second photoelectric conversion element device is mounted, and the first substrate and the second substrate are disposed separately, and the first photoelectric conversion element device and the second photoelectric conversion element device are disposed on different planes.

Preferably, the first optical component is adjustable so as to obtain a focal position that is suitable for a position in which the first original is placed, and the second optical component is adjustable so as to obtain a focal position that is suitable for a position in which the second original is placed.

Also Preferably, the image reading unit comprises connection means electrically connecting the first substrate and the second substrate to each other and electrically connecting one of the first substrate and the second substrate and a device provided externally of the image reading unit to each other.

Also preferably, the first photoelectric conversion element device and the first photoelectric conversion element device are disposed with a height difference therebetween, the height difference being settable to an arbitrary difference.

According to the present invention, when reading a reflective original, the first optical component and the first photoelectric conversion element device are used, and when reading a transparent original, the second optical component and the second photoelectric conversion element device are used. Thus, it is possible to optimally read images of both the reflective original and the transparent original with a single image reading unit. Further, since the first substrate on which the first photoelectric conversion element device is mounted and the second substrate on which the second photoelectric conversion element device is mounted are disposed separately, and the first photoelectric conversion element device and the second photoelectric conversion element device are disposed on different planes, it is possible to realize any desired focal position.

The above and other objects, features, and advantages of the invention will become more apparent from the following detailed description taken in conjunction with the accompanying drawings.

BRIEF DESCRIPTION OF THE DRAWINGS

FIGS. 1A to 1C are views schematically showing the construction of an image reading apparatus according to an embodiment of the present invention, in which:

FIG. 1A is a perspective view of the image reading apparatus;

FIG. 1B is a cross sectional view of the image reading apparatus; and

FIG. 1C is a top plan view of the image reading apparatus;

DETAILED DESCRIPTION OF THE PREFERRED EMBODIMENTS

The present invention will now be described in detail below with reference to the drawings showing an embodiment thereof.

Figure 1A:
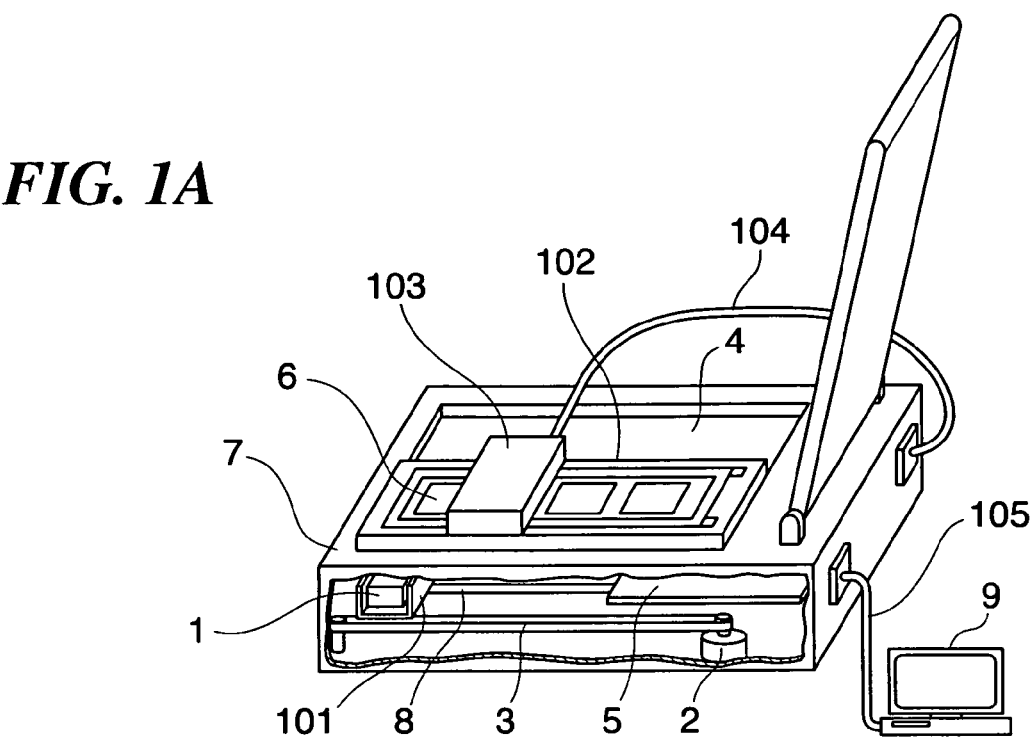
Figure 1B:
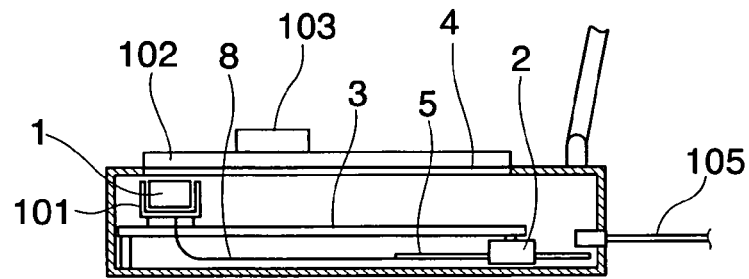
Figure 1C:
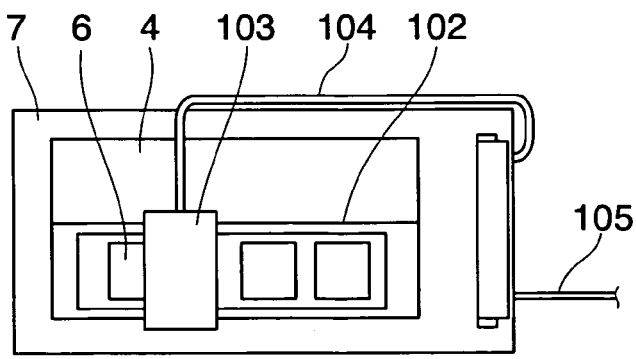

FIGS. 1A to 1C are views schematically showing the construction of an image reading apparatus according to an embodiment of the present invention, in which FIG. 1A is a perspective view of the image reading apparatus, FIG. 1B is a cross sectional view of the image reading apparatus, and FIG. 1C a top plan view of the image reading apparatus.

As shown in FIGS. 1A to 1C, the image reading apparatus is comprised of an image reading unit 1, a stepping motor 2, a belt 3, an original platen glass 4, a control substrate 5, a white color reference and original guide board 7, a flat cable 8, a holder 101, a film guide 102, and a light source unit for illuminating films (hereinafter abbreviated as the film light source) 103.

The image reading apparatus reads images of originals to be read (transparent originals and reflective originals) with the image reading unit 1 and is connected to an external device 9, such as a computer, through a cable 105. It should be noted that in FIG. 1, the external device 9 is illustrated on a reduced scale for the sake of convenience. The image reading unit 1 is mounted on the holder 101 which is fixed to the belt 3. The stepping motor 2 causes the image reading unit 1 to move with the belt 3 and the holder 101 in the longitudinal direction of the original platen glass 4 (the left-right direction as viewed in FIGS. 1A to 1C) by transmitting a rotative driving force to the belt 3 from its rotary shaft. On the original platen glass 4, the film guide 102 with a transparent original placed thereon or a reflecting original is placed.

Figure 2A:
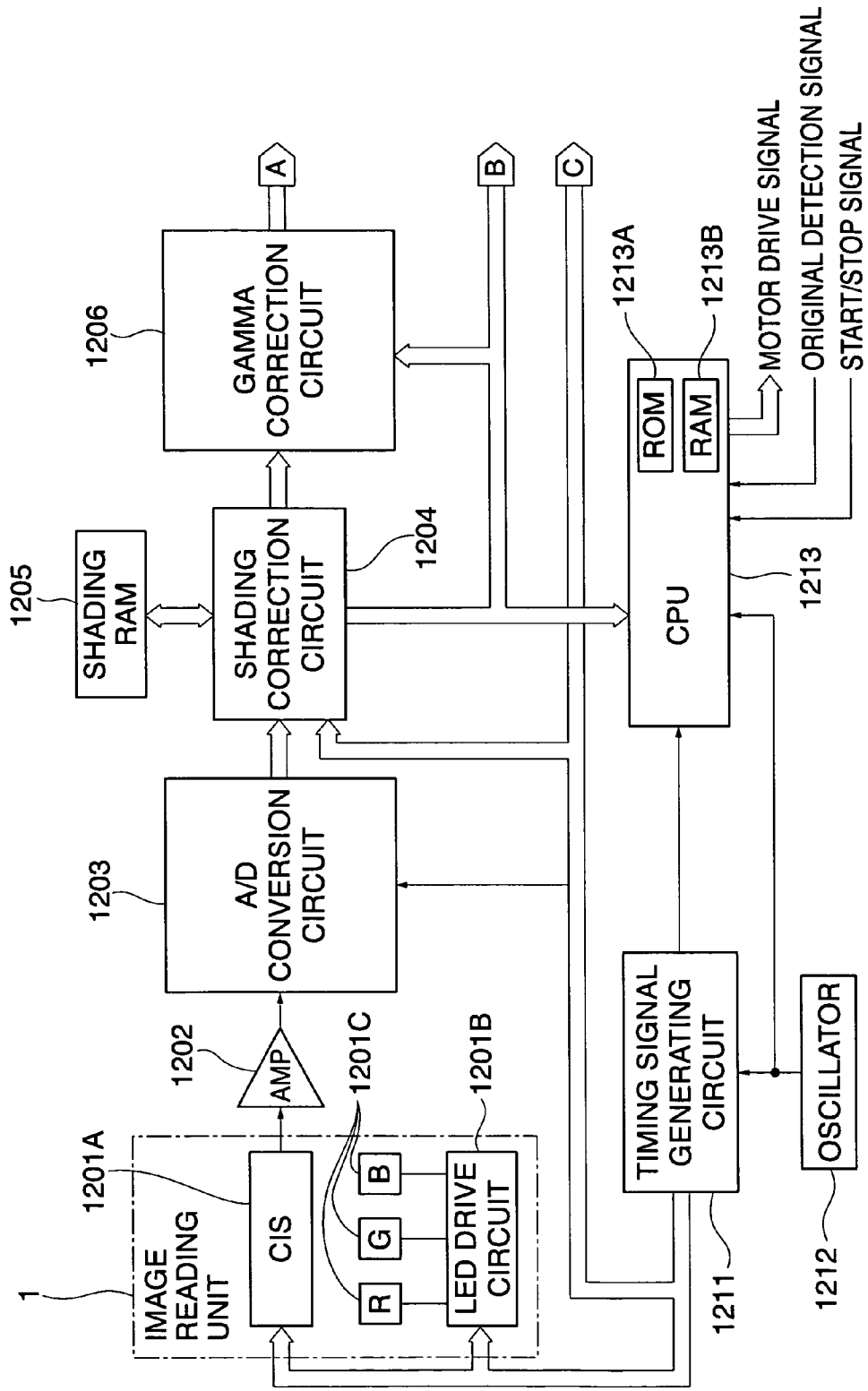
FIGS. 2A and 2B are block diagrams showing the configuration of a processing circuit mounted on a control substrate of the image reading apparatus.
Figure 2B:
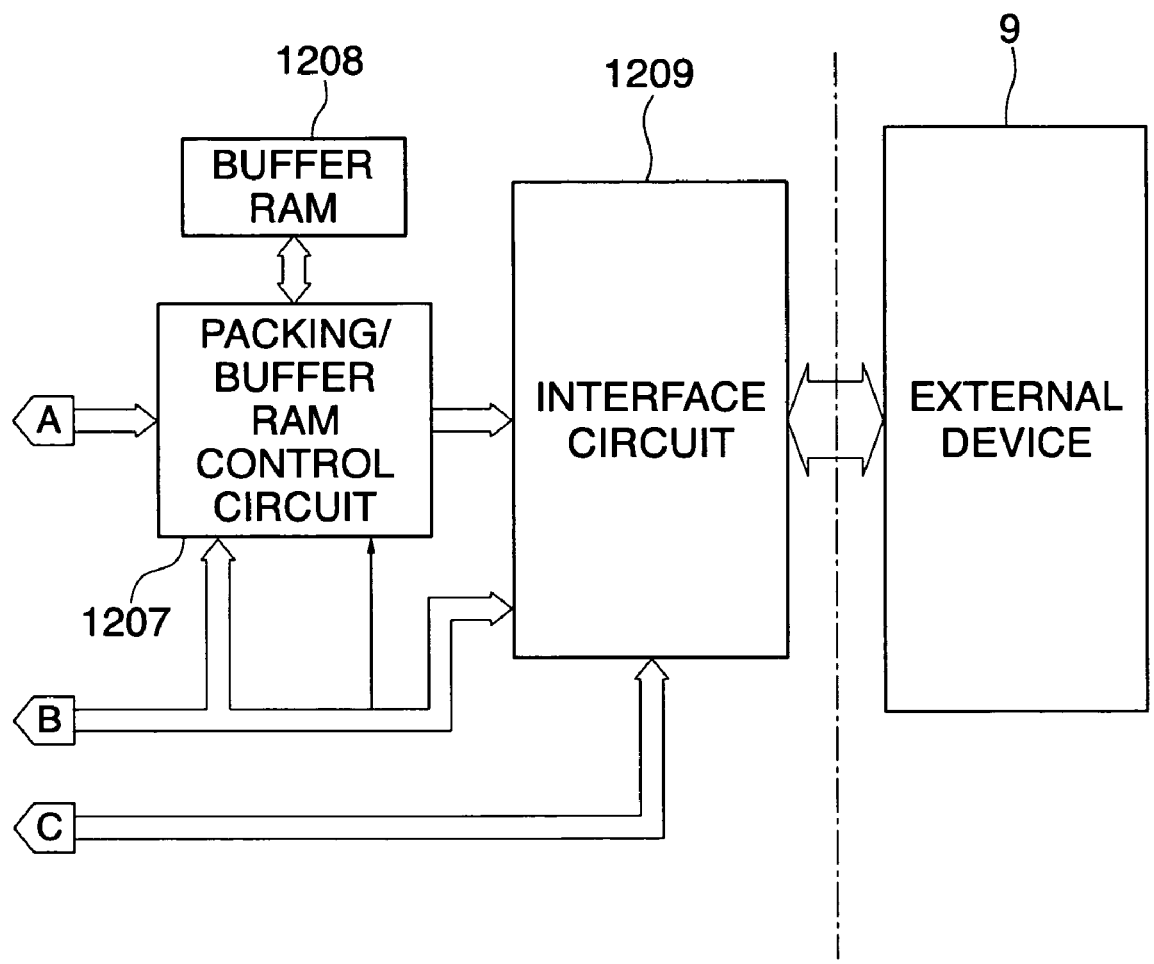

A processing circuit with a configuration as shown in FIGS. 2A and 2B, described hereinafter, is mounted on the control substrate 5. The white color reference and original guide board 7 is used as a white-color reference board in shading correction and also used as a document guiding board that regulates the original to be read. The flat cable 8 electrically connects the image reading unit 1 and the control substrate 5. A transparent 35 mm photographic film (hereinafter abbreviated as the photographic film) can be installed (stored) in the film guide 102. The film light source unit 103 is disposed on the side of the image reading apparatus which is opposite to the image reading unit 1 with respect to the original platen glass 4 and illuminates the photographic film 6. A cable 104 electrically connects the film light source unit 103 and the control substrate 5.

FIGS. 2A and 2B are block diagrams showing the configuration of the processing circuit that mounted on the control substrate 5 of the image reading apparatus.

As shown in FIGS. 2A and 2B, the control substrate 5 has mounted thereon a contact image sensor (hereinafter abbreviated as the CIS) 1201A, a LED drive circuit 1201B, LEDs 1201C, an amplifier 1202, an A/D conversion circuit 1203, a shading correction circuit 1204, a shading RAM 1205, a gamma conversion circuit 1206, a packing/buffer RAM control circuit 1207, a buffer RAM 1208, an interface circuit 1209, a timing signal generating circuit 1211, an oscillator 1212, and a CPU 1213.

The image reading unit 1, as described above, reads reflective originals placed on the original platen glass 4 appearing in FIG. 1 or images of the photographic film 6 stored in the film guide 102. The LEDs 1201C, which are light sources for illuminating reflective originals, and are also integrally mounted in the image reading unit 1. The LED drive circuit 1201B turns on and off LEDs of respective colors (red, green, and blue) for each line in the image while moving the image reading unit along the surface of the original on the original platen glass 4 to thereby sequentially read images of the respective colors per each line.

Moreover, the LEDs 1201C themselves may be ones that all radiate white-colored light and R, G and B (or C, M, Y, K) optical color filters may be provided on the light path extending from the LEDs 1201C to the reflective original, to thereby sequentially read images of the respective colors per each line, similarly to the above-described, i.e. illustrated example.

The amplifier 1202 amplifies signals output from the CIS 1201A. The signals output from the amplifier 1202 are converted from analog to digital, to obtain, for example, 8-bit digital signals. The shading RAM 1205 stores shading correction data, which is obtained by reading beforehand the white color reference and original guide board 7 by the image reading unit 1. The shading correction circuit 1204 carries out shading correction on the image data read from the original to be read by the image reading unit 1, based on the shading correction data stored in the shading RAM 1205.

The gamma conversion circuit 1206 carries out gamma conversion on the image data from the original read by the image reading unit 1, according to a gamma curve set beforehand by the external device 9. The buffer RAM 1208 temporarily stores the image data to match the timing of the actual reading operation of the image reading apparatus and the timing of the communication between the image reading apparatus and the external device 9. The packing/buffer RAM 1207 carries out packing processing on the image data according to a selected one of image output modes (binary, 4 bit multivalue, 8 bit multivalue, 24-bit multivalue) set beforehand by the external device 9, then carries out writing processing that writes the image data into the buffer RAM 1208, and causes the image data to be read out from the RAM 1208 and output to the interface circuit 1209.

The interface circuit 1209 carries out reception of control signals and transmission of image data to and from the external device 9. The CPU 1213, which is implemented by, for example, a microcomputer type CPU, is comprised of a ROM 1213A that stores processing procedures, and a working RAM 1213B, and controls various sections of the image reading apparatus according to the processing procedures stored in the ROM 1213A. Further, the CPU 1213 outputs a motor drive signal to a driver for driving the stepping motor 2 and inputs an original detection signal from an original sensor, not shown. The oscillator 1212 is implemented by, for example, a crystal oscillator. The timing signal generating circuit 1211 generates a variety of timing signals as operation reference signals by frequency-dividing an output from the oscillator 1212 according to settings made by the CPU 1213.

Figure 3:
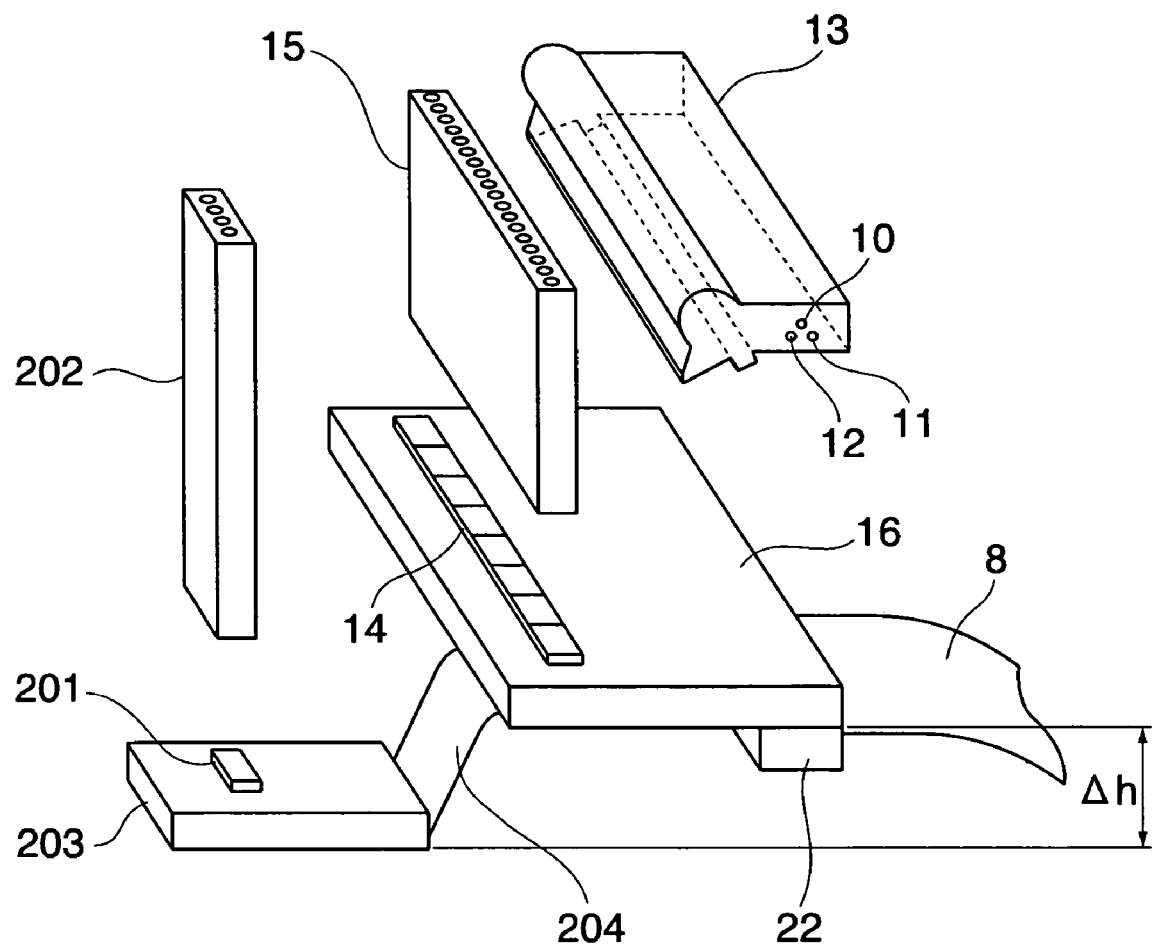
FIG. 3 is an exploded perspective view showing the internal construction of an image reading unit.

FIG. 3 is a perspective view showing the internal construction of the image reading unit.

As shown in FIG. 3, the image reading unit 1 is comprised of, in addition to the above-mentioned CIS 1201A and LED drive circuit 1201B, a red LED 10, a green LED 11, a blue LED 12, a light guide 13, a first photoelectric conversion element array 14, a first rod lens array 15, a second photoelectric conversion element array 201, a second rod lens array 202, a first substrate 16, and a second substrate 203.

The red LED 10, the green LED 11, and the blue LED 12 correspond to the respective LEDs 1201C in FIG. 2A. The light guide 13 irradiates light elongated in the longitudinal direction onto the original by repeatedly internally reflecting light emanating from the red LED 10, the green LED 11, and the blue LED 12 in the longitudinal direction (the lengthwise or depth direction as viewed in FIG. 3) of the image reading unit 1. The first photoelectric conversion element array 14 and the second photoelectric conversion element array 201 are disposed with their longer sides extending in the longitudinal direction of the image reading unit 1 and are mounted on the first substrate 16 and the second substrate 203, respectively. Further, the first photoelectric conversion element array 14 and the second photoelectric conversion element array 201 are disposed at different levels with a height difference ($\Delta h$) so that they can realize any desired focal position.

The first rod lens array 15 collects reflected light from a reflective original and projects the light onto the first photoelectric conversion element array 14, which in turn photoelectrically converts the reflected light from the reflective original into an electric signal. It should be noted that the first rod lens array 15 can be adjusted so as to obtain a focal position that is suitable for the position in which the reflective original is placed.

On the other hand, the second rod lens array 202 collects light transmitted from a transparent original and projects the light onto the second photoelectric conversion element array 201, which in turn photoelectrically converts the transmitted light from the transparent original into an electric signal. It should be noted that the second rod lens array 202 can be adjusted so as to obtain a focal position that is suitable for the position in which the transparent original is placed.

The first substrate 16 on which the first photoelectric conversion element array 14 is mounted and the second substrate 203 on which the second photoelectric conversion element array 201 is mounted are disposed separately from each other so that the first photoelectric conversion element array 14 and the second photoelectric conversion element array 201 are disposed on different planes. The first substrate 16 and the control substrate 5 (FIGS. 1A and 1B) are electrically connected to each other via a connector 22 by the flat cable 8, and the first substrate 16 and the second substrate 203 are electrically connected to each other by the flat cable 204.

Figure 4A:
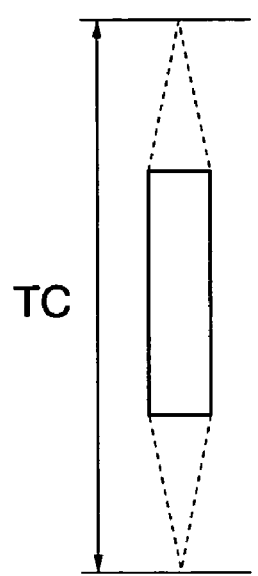
FIGS. 4A and 4B are diagrams useful in explaining a first rod lens array and a second rod lens array of the image reading unit.
Figure 4B:
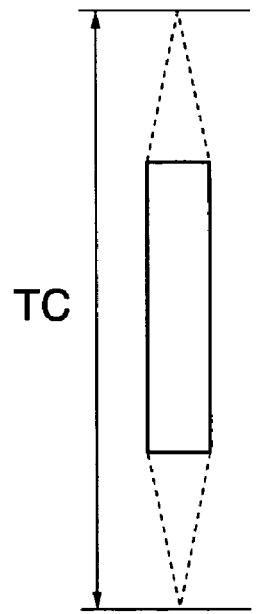

FIGS. 4A and 4B are diagrams useful in explaining the first rod lens array 15 and the second rod lens array 202 of the image reading unit 1.

In FIGS. 4A and 4B, Type A designates a rod lens used in the first rod lens array 15 and a Type B designates a rod lens used in the second rod lens array 202. Symbol TC designates the distance between focal points (conjugate length; TC) when each rod lens of Type A and Type B is viewed from a side thereof. In this example, the Type A conjugate length (TC) is 15.1 mm, and the Type B conjugate length (TC) is 17 mm.

Next, the operation of the image reading apparatus will be briefly described. First, the stepping motor 2 is driven by a motor drive signal output from the CPU 1213 on the control substrate 5. The driving force of the stepping motor 2 is transmitted through the belt 3 to the holder 101 on which the image reading unit 1 is mounted. The image reading unit 1 continuously moves along in the longitudinal direction of the original platen glass 4 to scan an original (a reflective original or a transparent original) that is placed on the original platen glass 4.

Here, a further description will be given of the photoelectric conversion element arrays 14 and 201 and the rod lens arrays 15 and 202. As shown in FIG. 3, the first photoelectric conversion element array 14 and the second photoelectric conversion element array 201, both constituting the image reading unit 1, are disposed with their longer sides extending in the longitudinal direction of the image reading unit 1.

In the present embodiment, the first photoelectric conversion element array 14 is provided for reading A4 size reflective originals. The first photoelectric conversion element array 14 is capable of reading a reflective original of an A4 size at a density equivalent to 600 dpi along the shorter side thereof (210 mm). The first photoelectric conversion element array 14 is composed of eight photoelectric conversion cells, each having 645 elements, arranged in a straight line, that is, photoelectric conversion elements corresponding to totally 5160 image pixels are arranged in a line on the first substrate 16. The first photoelectric conversion element array 14 has a reading image length of approximately 219 mm and thus is suitable reading an A4 size reflective original along the shorter side thereof while moving parallel with the shorter side.

The reading image length of the first rod lens array 15 associated with the first photoelectric conversion element array 14 has a reading image length set to the same length as the first photoelectric conversion element array 14, that is, approximately 219 mm. The first rod lens array 15 has a TC value of 15.1 mm and is disposed at such a position that optimal focuses can be obtained on the upper surface of the original platen glass 4 on which the reflective original is placed and on the first photoelectric conversion element array 14.

On the other hand, the second photoelectric conversion element array 201 is provided for reading transparent originals such as a photographic film at a high speed and at a high resolution. The second photoelectric conversion element array 201 is capable of reading a reflective original at a density equivalent to 2400 dpi and is composed of a single photoelectric conversion cell having 2576 elements. The second photoelectric conversion element array 201 has a reading image length of approximately 27 mm and thus is suitable for reading a photographic film along the shorter side thereof while moving parallel with the shorter side because the 35 mm photographic film has a shorter side size of approximately 24 mm. Further, because of its short reading image length, the second photoelectric conversion element array 201 has a higher image transfer speed per line compared with the case where the reading density is 2400 dpi and the reading image length is A4 size (210 m), thus leading to a decrease in cost.

The reading image length of the second rod lens array 202 associated with the second photoelectric conversion element array 201 has a reading image length set to the same length as the second photoelectric conversion element array 201, that is, approximately 27 mm. The second rod lens array 202 has a TC value of 17 mm and is disposed at such a position that optimal focuses can be obtained at a position a height of 1 mm above the upper surface of the original platen glass 4 whereon the transparent original is placed and on the second photoelectric conversion element array 201.

Figure 5:
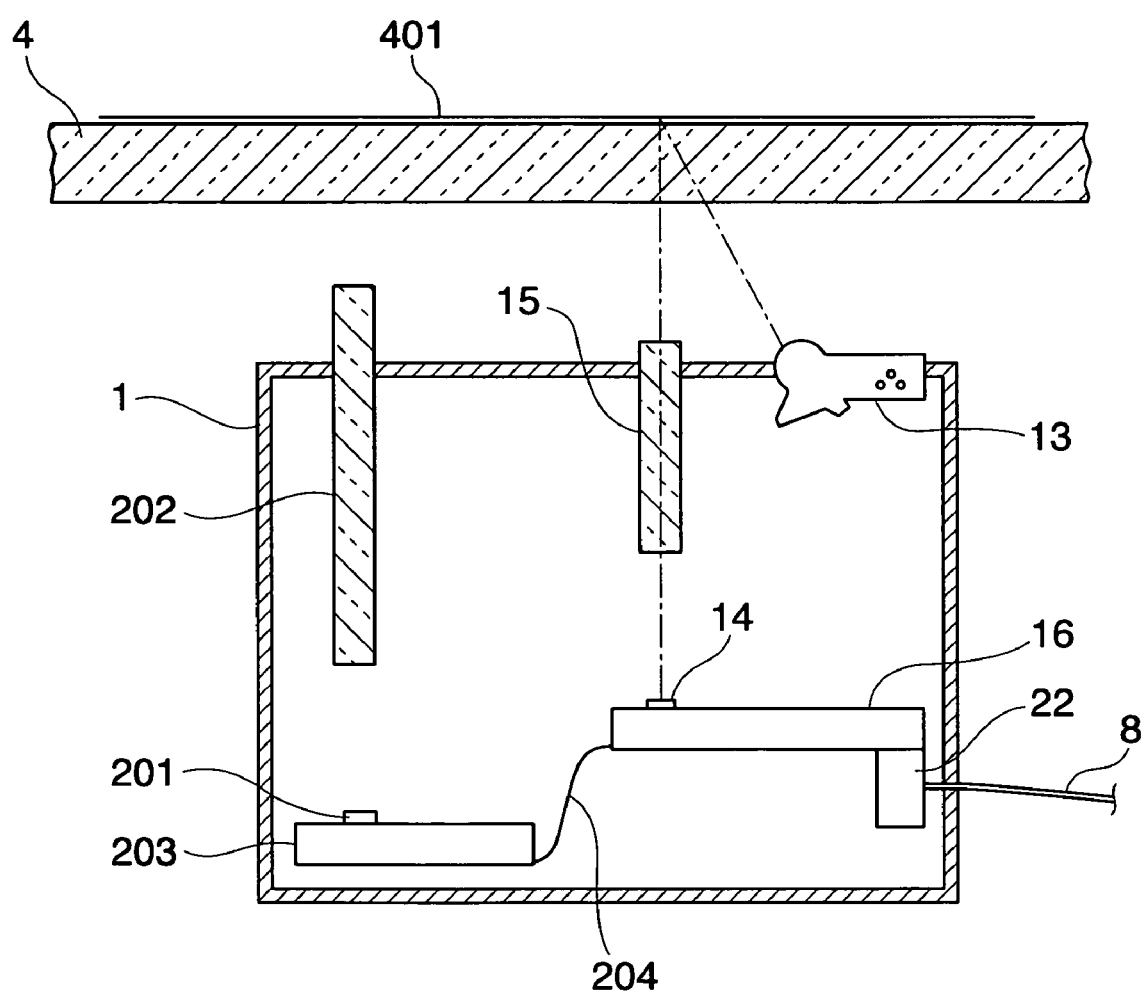
FIG. 5 is a cross sectional view showing the image reading unit in a position for reading a reflective original.

FIG. 5 is a cross sectional view showing the image reading unit in a position for reading a reflective original.

As shown in FIG. 5, in the image reading unit 1, there are disposed the light guide 13, the first photoelectric conversion element array 14 mounted on the first substrate 16, the first rod lens array 15, the second photoelectric conversion element array 201 mounted on the second substrate 203, the second rod lens array 202, and the connector 22 for connecting the first substrate 16 to the flat cable 8. When reading a reflective original, the light guide 13, the first photoelectric conversion element array 14, and the first rod lens array 15 are used.

Figure 6:
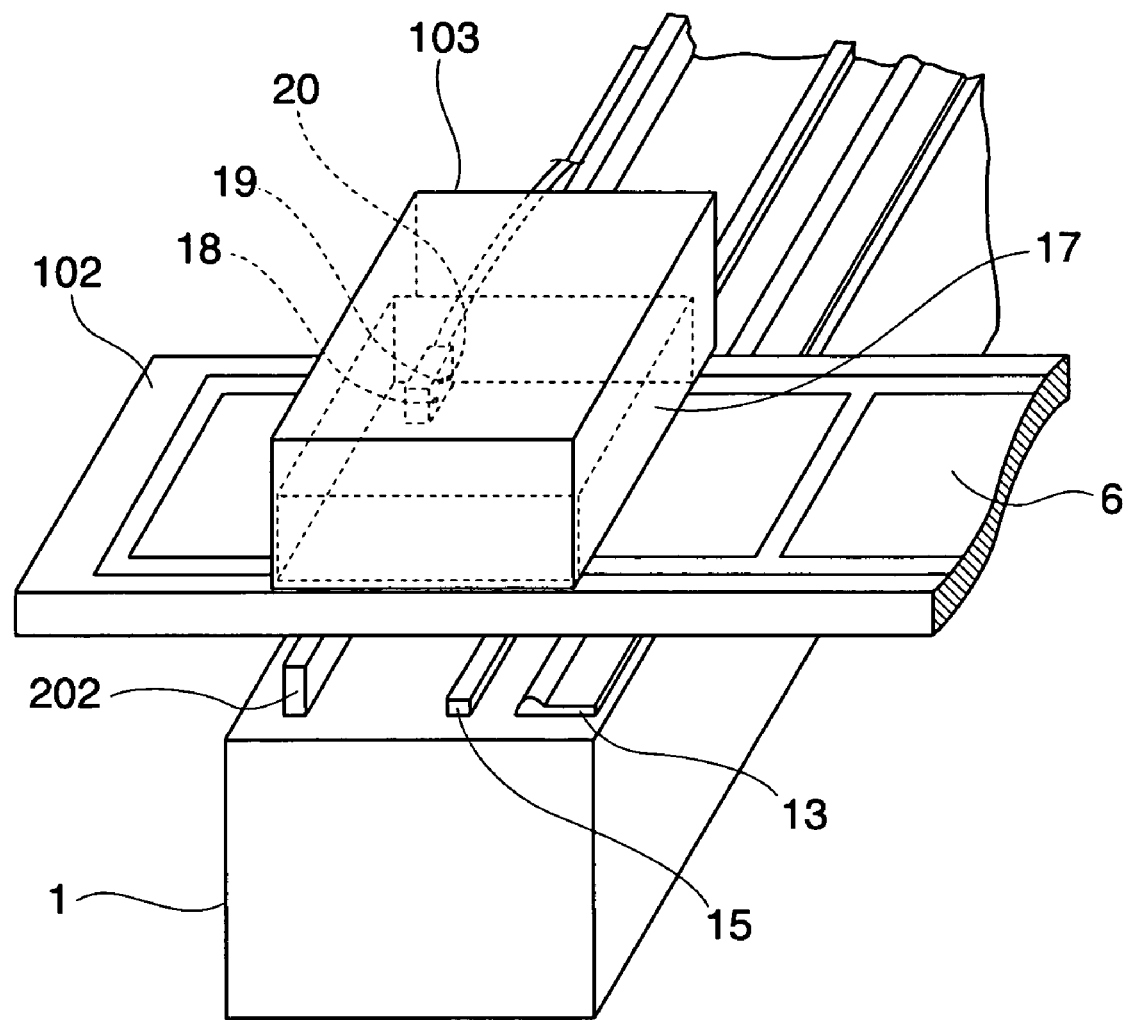
FIG. 6 is a fragmental perspective view showing the arrangement of a light source unit for illuminating films and a film guide.

FIG. 6 is a fragmental perspective view showing the arrangement of the film light source unit 103 and the film guide 102.

As shown in FIG. 6, the film light source unit 103 and the film guide 102 are used when reading a photographic film 6. The film light source unit 103 has a diffusing plate 17, a red LED 18, a green LED 19, and a blue LED 20 disposed therein. In the present embodiment, the diffusing plate 17 can be implemented by, for example, a surface light source as disclosed in Japanese Laid-Open Patent Publication (Kokai) No. 2001-34210, and has a size of 50 mm×25 mm, and hence can illuminate an area having a size of the effective image area for one frame of the photographic film 6, that is, approximately 36 mm×24 mm.

Figure 7:
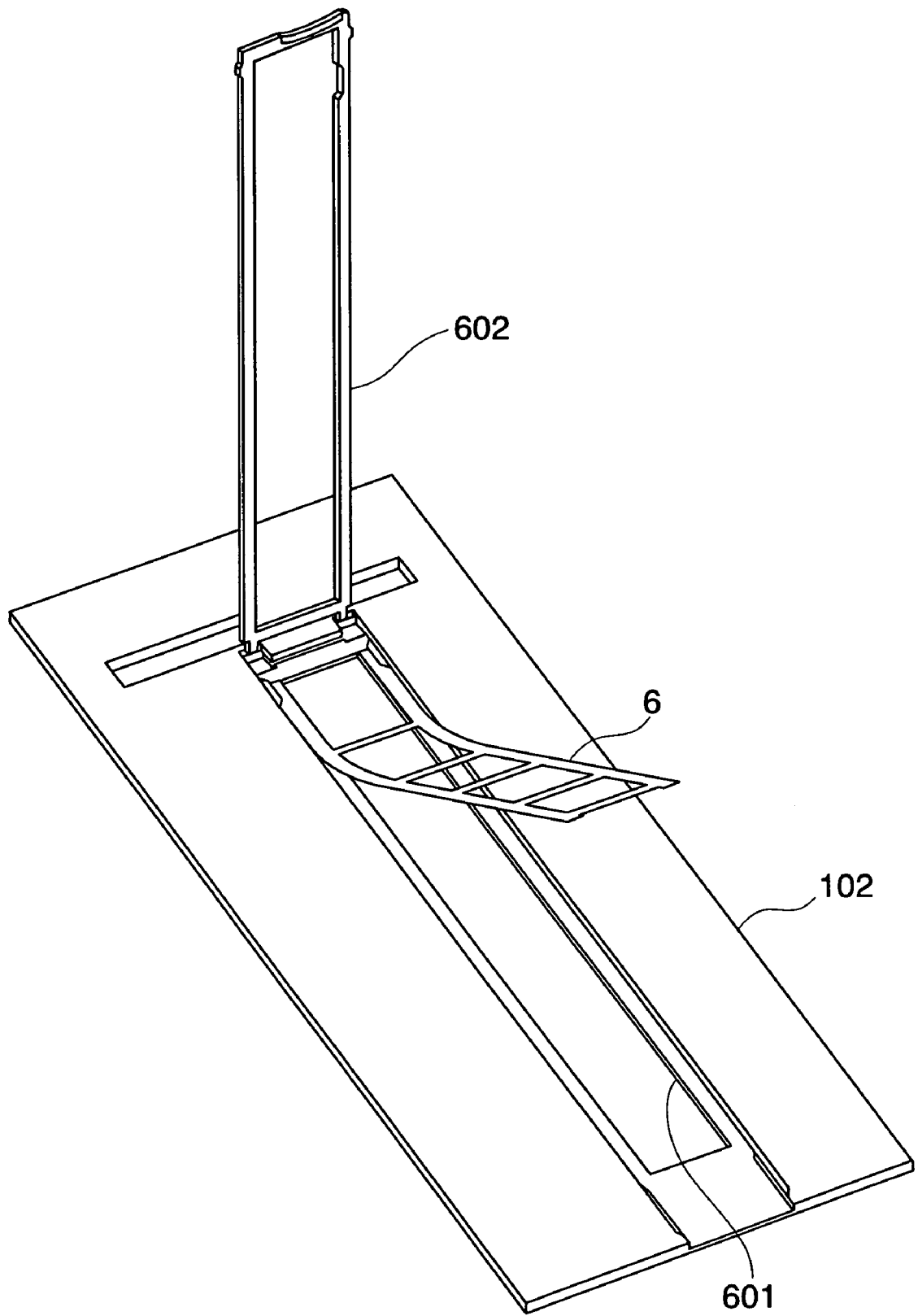
FIG. 7 is a perspective view useful in explaining a method of installing a photographic film in the film guide.

FIG. 7 is a perspective view showing a method of installing a photographic film in the film guide 102.

As shown in FIG. 7, the film guide 102 is comprised of a window frame 601 and a film clamp 602. The photographic film 6 is installed in the window frame 601 and secured by the film clamp 602. The thickness of the window frame 601 is set to, for example, 1 mm. Thus, when the photographic film 6 is placed on the upper surface of the original platen glass 4, it rests at a height of 1 mm above the upper surface of the original platen glass 4.

Figure 8:
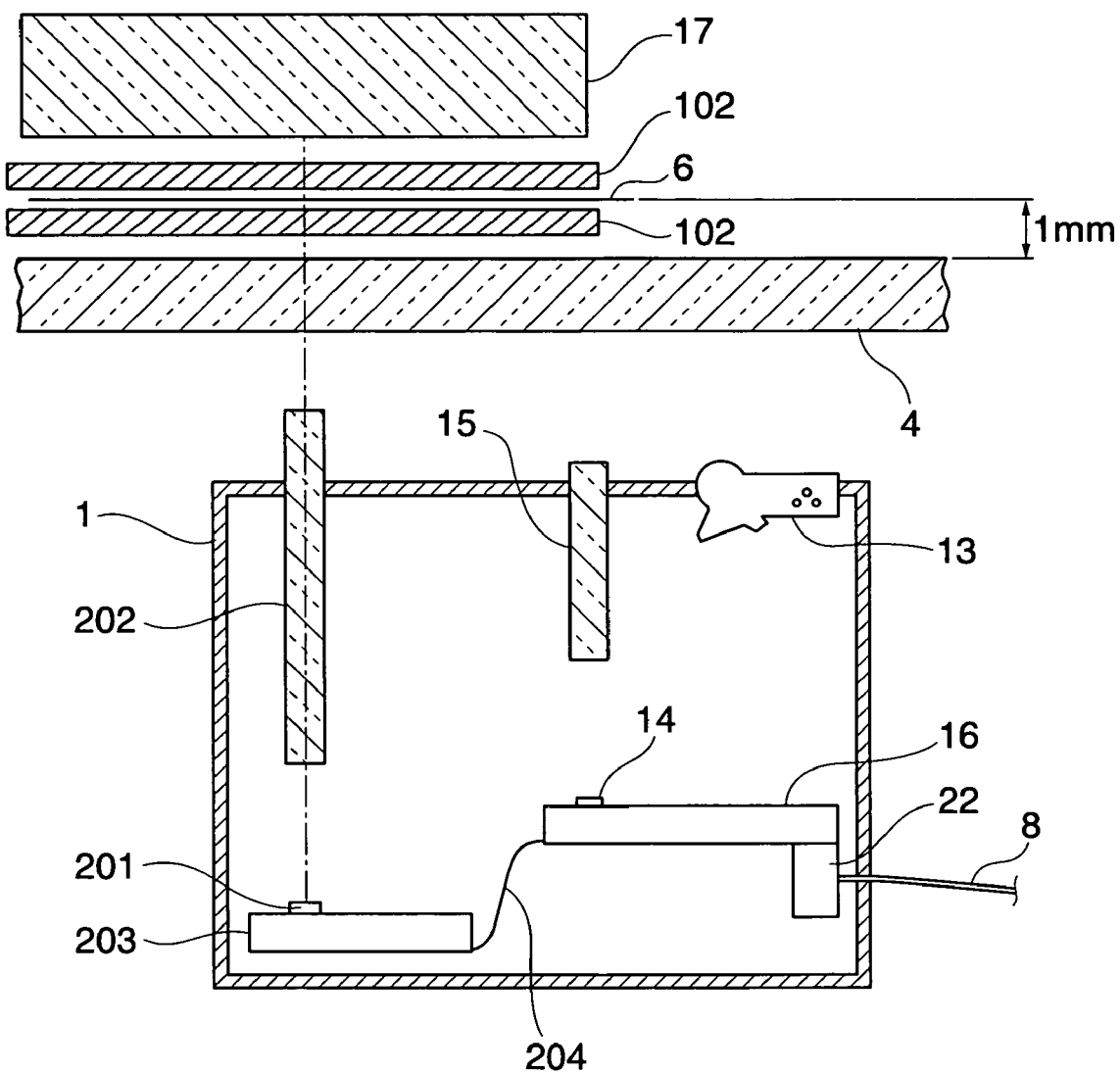
FIG. 8 is a cross sectional view showing the image reading unit in a position for reading a photographic film as a transparent original.

FIG. 8 is a cross sectional view showing the image reading unit in a position for reading the photographic film 6 as a transparent original.

In FIG. 8, the arrangement of the image reading unit 1 is identical to the arrangement shown in FIG. 5, description of which is, therefore, omitted. When reading the photographic film 6, the film light source unit 103, the second photoelectric conversion element array 201, and the second rod lens array 202 are used.

Next, the operation of the image reading apparatus according to the present embodiment constructed as above will be described in detail with reference to FIGS. 1 through 8.

First, a description will be given of an operation of reading a reflective original by the image reading unit 1 of the image reading apparatus.

When reading a reflective original 401, as shown in FIGS. 3 and 5, upon generation of a read start pulse (Hsync), light beams from the red LED 10, the green LED 11, and the blue LED 12 are guided in the longitudinal direction of the image reading unit 1 by the light guide 13 and irradiated in the same direction so that the light beams reach the upper surface of the original platen glass 4. The light beams from the LEDs 10, 11, and 12 irradiated by the light guide 13 are diffusely reflected by the reflective original 401 placed on the original platen glass 4. Then, the reflected light beams are collected by the first rod lens array 15 and projected onto the photoelectric conversion element 14.

The first rod lens array 15, which has a TC value of 15.1 mm as shown in FIG. 4A, is disposed at such a position that optimal focuses can be obtained on the upper surface of the original platen glass 4 and on the first photoelectric conversion element array 14. The first rod lens array 15 projects light beams of an image of the reflective original 401 directly or at a magnification of 100% onto the first photoelectric conversion element array 14. The light beams from the LEDs 10, 11, and 12 projected onto the first photoelectric conversion element array 14 are accumulated as electric charges on the first photoelectric conversion element array 14, and the electric charges are stored in the first photoelectric conversion element array 14 by a transmission section, not shown, of the first photoelectric conversion element array 14 upon generation of the next start pulse (Hsync). Then, the stored electric charges are output as electric signals for one pixel upon generation of a pixel reading clock.

The red LED 10, the green LED 11, and the blue LED 12 are turned on and off each time the read start pulse (Hsync) is generated. As the image reading unit 1 moves, the LEDs 10, 11, and 12 are sequentially turned on or lit by the LED drive circuit 1201B. Image data thus obtained by the color separation by the LEDs 10, 11, and 12 is sent from the control substrate 5 to the external device 9 via the flat cable 8, to be subjected to image processing by the external device 9.

Next, a description will be given of an operation of reading a photographic film 6 as a transparent original by the image reading unit 1 of the image reading apparatus will be explained.

When reading the photographic film 6, the film guide 102 in which the photographic film 6 installed is placed on the upper surface of the original platen glass 4 (FIG. 8). On this occasion, the guide 102 is placed so that the photographic film 6 is within the effective reading area of the second photoelectric conversion element array 201 of the image reading unit 1. Light beams from the red LED 18, the green LED 19, and the blue LED 20 of the film light source unit 103 are diffused by the diffusing plate 17 of the film light source unit 103 and are emitted as uniform light beams from the bottom side of the diffusing plate 17. The uniform light beams are transmitted through the photographic film 6, collected by the second rod lens array 202, and projected onto the second photoelectric conversion element array 201.

The second rod lens array 202, which has a TC value of 17 mm, is disposed such a position that optimal focuses can be obtained at a position a height of 1 mm above the upper surface of the original platen glass 4 and on the second photoelectric conversion element array 201. The second rod lens array 202 projects light beams of an image of the photographic film 6 directly or at a magnification of 100% onto the second photoelectric conversion element array 201. The light beams from the LEDs 18, 19, and 20 projected onto the second photoelectric conversion element array 201 are accumulated as electric charges on the second photoelectric conversion element array 201. The subsequent operations are the same as the above described operations for reading a reflective original.

Here, as described above, the first photoelectric conversion element array 14 and the second photoelectric conversion element array 201 are mounted separately on the first substrate 16 and the second substrate 203, respectively. Due to this separate mounting, by determining as desired the height Δh from the bottom surface of the second substrate 203 to the bottom surface of the first substrate 16 (in other words, the difference in height between the first photoelectric conversion element array 14 and the second photoelectric conversion element array 201) from the TC value of 17 mm of the second rod lens array 202 and the height of 1 mm of the photographic film 6 from the upper surface of the original platen glass 4, it is possible to dispose the second rod lens array 202 at such a position that optimal focuses can be obtained on the photographic film 6 and on the second photoelectric conversion element array 201.

Further, the electric connection of the first substrate 16 and the second substrate 203 is achieved by the flat cable 204, and the electric connection of the first substrate 16 and the control substrate 5 is achieved by the flat cable 8 that is connected to the connector 22 disposed on the first substrate 16 make it unnecessary to use the flat cable 8 for each of the two photoelectric conversion element arrays, that is, the first photoelectric conversion element array 14 and the second photoelectric conversion element array 201, thereby enabling a reduction in the number of component parts used as well as curtailment of the cost.

Although the photographic film 6 is placed 1 mm above the original platen glass 4, the use of the second rod lens array 202 enables focal point adjustment such that an image of the photographic film 6 can be read with a suitable resolution.

As described above, according to the present embodiment, an image reading apparatus is provided, which has a single image reading unit comprised of the first photoelectric conversion element array 14, the first rod lens array 15, the second photoelectric conversion element array 201, and the photoelectric conversion element array 202, wherein when reading a reflective original, the first photoelectric conversion element array 14 and the first rod lens array 15 that has been adjusted so as to obtain a focal position that is suitable for the position in which the reflective original is placed are used, while, when reading a transparent original, the second photoelectric conversion element array 201 and the second rod lens array 202 that has been so as to obtain a focal position that is suitable for the position in which the transparent original is placed are used.

As a result, it is possible to prevent a blurred read image which is out of focus from being obtained depending upon the distance between the original platen glass and a transparent original placed thereon when reading the transparent original with the conventional image reading unit using a rod lens array, and to optimally read images of both reflective originals and transparent originals with a single image reading unit.

Further, since the disposition of the first photoelectric conversion element array 14 and the second photoelectric conversion element array 201 are disposed at different levels with a height difference (Δh) that can be set as desired, any desired focal position can be realized.

Further, since inside the image reading unit 1, the first substrate 16 and the second substrate 203 are electrically connected to each other via the flat cable 204, and the first substrate 16 and the control substrate 5 are electrically connected to each other via the connector 22 disposed on the first substrate 16 and the flat cable 8, the electrical connection between the image reading unit 1 and the control substrate 5 does not require wiring of a flat cable for each of the first electric conversion element array 14 and the second electric conversion element array 201, thereby enabling a reduction in the number of component parts used in the image reading apparatus and curtailment of the manufacturing cost.

In the above-described embodiment, an example has been given of the arrangement where the connector 22 of the first substrate 16 and the control substrate 5 are electrically connected via the flat cable 8 and the first substrate 16 and the second substrate 203 are electrically connected via the flat cable 204, but the present invention is not limited to this example. Alternatively, an arrangement is possible where a connecter is provided on the substrate 204 instead of the connector 22 provided on the first substrate 16, the connector provided on the second substrate 204 and the control substrate 5 are electrically connected via the flat cable 8, and the first substrate 16 and the second substrate 203 are electrically connected via the flat cable 204.

CROSS REFERENCE TO RELATED APPLICATION

This application claims priority from Japanese Patent Application No. 2004-105870 filed Mar. 31, 2004, which is hereby incorporated by reference herein.

What is claimed is:

1. An image reading unit comprising:
a first optical component that collects reflected light from a reflective original that reflects light, the reflective original being disposed on one side of the image reading unit;
a first photoelectric conversion element device that reads an image of the reflective original based on the reflected light collected by said first optical component;
a second optical component that collects light transmitted through a transparent original that transmits light, the transparent original being disposed on the one side of the image reading unit and at a position different from the reflective original;
a second photoelectric conversion element device that reads an image of the transparent original based on the transmitted light collected by said second optical component;
a first substrate on which said first photoelectric conversion element device is mounted; and
a second substrate on which said second photoelectric conversion element device is mounted,
wherein said first substrate and said second substrate are disposed separately, and said first photoelectric conversion element device and said second photoelectric conversion element device are disposed on different planes on a same side from the reflective or transparent original,
wherein said first optical component and said second optical components are disposed on the same side from the reflective or transparent original,
wherein said first optical component is adjustable so as to obtain a focal position that is suitable for a position in which the reflective original is placed, and said second optical component is adjustable so as to obtain a focal position that is suitable for a position in which the transparent original is placed, and
wherein the first substrate and the second substrate are disposed with a height difference therebetween, the height difference being settable to an arbitrary difference.

2. An image reading unit as claimed in claim 1, further comprising a flat cable that electrically connects said first substrate and said second substrate to each other and another flat cable that electrically connects one of said first substrate or said second substrate and a device provided externally of the image reading unit to each other.

3. An image reading apparatus comprising:
an original platen glass on which a reflective original or a transparent original apart from the reflective original at a distance of a film guide installing the transparent original is placed;
an image reading unit that reads the image of the reflective original or the transparent original through the original platen glass;
a first illuminating component that is provided in said image reading unit, for illuminating the reflective original; and
a second illuminating component that is disposed on a side of the image reading apparatus which is opposite to said image reading unit with respect to said original platen glass, for illuminating the transparent original;
wherein said image reading unit comprises:
a first optical component that collects reflected light from a reflective original that reflects light;
a first photoelectric conversion element device that reads an image of the reflective original based on the reflected light collected by said first optical component;
a second optical component that collects light transmitted through a transparent original that transmits light;
a second photoelectric conversion element device that reads an image of the transparent original based on the transmitted light collected by said second optical component;
a first substrate on which said first photoelectric conversion element device is mounted; and
a second substrate on which said second photoelectric conversion element device is mounted,
wherein said first substrate and said second substrate are disposed separately, and said first photoelectric conversion element device and said second photoelectric conversion element device are disposed on different planes,
wherein said first optical component is adjustable so as to obtain a focal position that is suitable for a position in which the reflective original is placed, and said second optical component is adjustable so as to obtain a focal position that is suitable for a position in which the transparent original is placed, and
wherein the first substrate and the second substrate are disposed with a height difference therebetween, the height difference being settable to an arbitrary difference.

4. An image reading apparatus as claimed in claim 3, further comprising a processing section that processes image data read from the reflective original or the transparent original by said image reading unit, a storage medium that stores the image data processed by said processing section, and a communication section that carries out data communications with an external device.

* * * * *